US012812687B2

(12) United States Patent
Matsumura et al.

(10) Patent No.: US 12,812,687 B2
(45) Date of Patent: Nov. 24, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Weiqi Sun, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 296 days.

(21) Appl. No.: 18/682,289

(22) PCT Filed: Aug. 16, 2022

(86) PCT No.: PCT/JP2022/030934

§ 371 (c)(1),
(2) Date: Feb. 8, 2024

(87) PCT Pub. No.: WO2023/022142

PCT Pub. Date: Feb. 23, 2023

(65) Prior Publication Data

US 2025/0133598 A1 Apr. 24, 2025

(30) Foreign Application Priority Data

Aug. 16, 2021 (JP) ................................ 2021-132433

(51) Int. Cl.
*H04W 74/0833* (2024.01)
*H04W 52/04* (2009.01)

(52) U.S. Cl.
CPC ....... *H04W 74/0833* (2013.01); *H04W 52/04* (2013.01)

(58) Field of Classification Search
CPC . H04W 74/0833; H04W 52/04; H04W 48/16; H04W 52/50; H04W 72/04;
(Continued)

(56) References Cited

U.S. PATENT DOCUMENTS 12,144,032 B2 * 11/2024 Li ............................ G01V 1/16
12,238,695 B2 * 2/2025 Kim .................... H04W 72/046
(Continued)

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
(Continued)

*Primary Examiner* — Brian T O Connor
(74) *Attorney, Agent, or Firm* — Osha Bergman Watanabe & Burton LLP

(57) ABSTRACT

To properly perform communication even in a case where communication is performed using a plurality of transmission points. A terminal according to an aspect of the present disclosure includes: a receiving section that receives a downlink control channel indicating transmission of a random access channel to at least one of a serving cell and a non-serving cell; and a control section that controls transmission of the random access channel on the basis of at least one of a random access channel configuration corresponding to a given cell and power information regarding a synchronization signal block corresponding to the given cell when the random access channel is transmitted on the basis of the downlink control channel.

5 Claims, 9 Drawing Sheets

(58) Field of Classification Search
CPC ............. H04W 74/08; H04W 74/0838; H04W 74/0841; H04W 16/28; H04L 5/0048; H04L 5/0051; H04L 5/0091; H04L 5/001; H04L 5/0023; H04L 5/0094
See application file for complete search history.

(56) References Cited

U.S. PATENT DOCUMENTS

| | | | | |
|---|---|---|---|---|
| 12,261,664 | B2 * | 3/2025 | Kim | H04L 27/261 |
| 12,284,689 | B2 * | 4/2025 | MolavianJazi | H04L 5/0048 |
| 12,362,859 | B2 * | 7/2025 | Lim | H04W 72/0453 |
| 12,621,039 | B2 * | 5/2026 | Zhou | H04B 7/0404 |
| 2021/0176687 | A1 * | 6/2021 | Ko | H04L 5/0048 |
| 2021/0219255 | A1 | 7/2021 | Zhang et al. | |
| 2022/0141881 | A1 * | 5/2022 | Bai | H04W 56/0015 370/329 |
| 2022/0210844 | A1 * | 6/2022 | MolavianJazi | H04L 5/0053 |
| 2023/0180141 | A1 * | 6/2023 | Zhou | H04B 7/0404 455/522 |
| 2023/0232290 | A1 * | 7/2023 | Cui | H04L 5/0023 370/331 |
| 2024/0080899 | A1 * | 3/2024 | Du | H04L 5/0098 |
| 2024/0430949 | A1 * | 12/2024 | Li | G01V 1/16 |

OTHER PUBLICATIONS

International Search Report issued in corresponding International Application No. PCT/JP2022/030934, mailed on Oct. 25, 2022 (5 pages).

Written Opinion issued in corresponding International Application No. PCT/JP2022/030934, mailed on Oct. 25, 2022 (4 pages).

* cited by examiner

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a universal mobile telecommunications system (UMTS) network, specifications of long term evolution (LTE) have been drafted for the purpose of further increasing data rates, providing low delay, and the like (Non Patent Literature 1). In addition, the specifications of LTE-Advanced (3GPP releases (Rels.) 10 to 14) have been drafted for the purpose of further increasing capacity and advancement of LTE (third generation partnership project (3GPP) Rels. 8 and 9).

Successor systems to LTE (for example, also referred to as 5th generation mobile communication system (5G), 5G+ (plus), 6th generation mobile communication system (6G), New Radio (NR), or 3GPP Rel. 15 and subsequent releases) are also being studied.

CITATION LIST

Non Patent Literature

Non Patent Literature 1: 3GPP TS 36.300 V8.12.0 “Evolved Universal Terrestrial Radio Access (E-UTRA) and Evolved Universal Terrestrial Radio Access Network (E-UTRAN); Overall description; Stage 2 (Release 8)”, April 2010

SUMMARY OF INVENTION

Technical Problem

In a future radio communication system (for example, a radio communication system after Rel. 16/5G), it is assumed that communication is controlled on the basis of mobility between a plurality of cells (inter-cell mobility) including a non-serving cell or inter-cell mobility using a plurality of transmission/reception points (for example, multi-TRPs (MTRP)).

However, when UL transmission is performed to a plurality of transmission/reception points, how to control the UL transmission control (for example, configuration information/transmission parameters to be used, and the like) becomes a problem. In a case where the UL transmission to each transmission/reception point is not properly controlled, the quality of communication using a plurality of transmission/reception points may deteriorate.

The present disclosure has been made in view of the above point, and an object is to provide a terminal, a radio communication method, and a base station capable of appropriately performing communication even in a case where communication is performed using a plurality of transmission points.

Solution to Problem

A terminal according to an aspect of the present disclosure includes: a receiving section that receives a downlink control channel indicating transmission of a random access channel to at least one of a serving cell and a non-serving cell; and a control section that controls transmission of the random access channel on the basis of at least one of a random access channel configuration corresponding to a given cell and power information regarding a synchronization signal block corresponding to the given cell when the random access channel is transmitted on the basis of the downlink control channel.

Advantageous Effects of Invention

According to an aspect of the present disclosure, it is possible to properly perform communication even in a case where communication is performed using a plurality of transmission points.

Figure 1A:
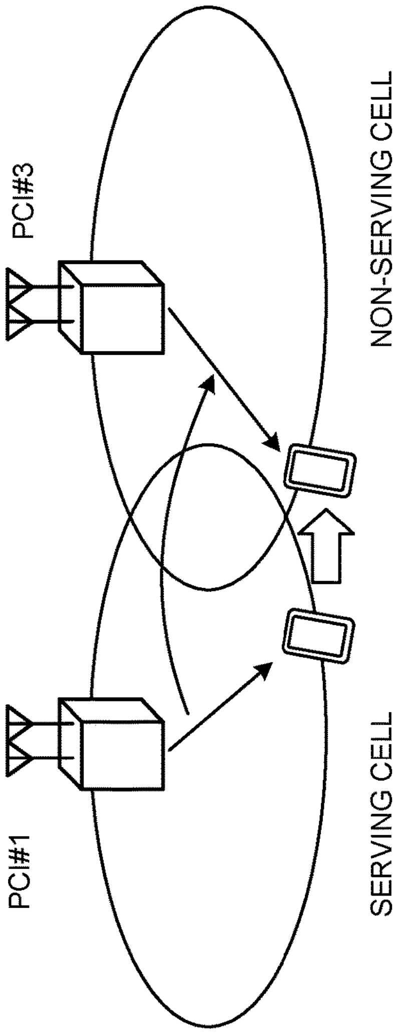
FIGS. 1A and 1B are diagrams illustrating an example of inter-cell mobility.

DESCRIPTION OF EMBODIMENTS (TCI, Spatial Relation, and QCL)

In NR, it has been studied to control reception processing (for example, at least one of reception, demapping, demodulation, and decoding) and transmission processing (for example, at least one of transmission, mapping, precoding, modulation, and coding) in UE of at least one of a signal and a channel (expressed as a signal/channel) on the basis of a transmission configuration indication state (TCI state).

The TCI state may represent what is applied to a downlink signal/channel. Those corresponding to the TCI state applied to an uplink signal/channel may be expressed as a spatial relation.

The TCI state is information regarding a quasi-co-location (QCL) of the signal/channel, and may also be referred to as, for example, a spatial Rx parameter, spatial relation information, or the like. The TCI state may be configured in the UE for each channel or each signal.

The QCL is an indicator indicating a statistical property of a signal/channel. For example, when one signal/channel and another signal/channel have a QCL relation may mean that it is possible to assume that at least one of Doppler shift, Doppler spread, an average delay, a delay spread, and a spatial parameter (for example, a spatial Rx parameter) is identical (in QCL with respect to at least one of these) between the plurality of different signals/channels.

Note that the spatial Rx parameter may correspond to a reception beam of the UE (for example, a reception analog beam), and the beam may be specified on the basis of spatial QCL. The QCL (or at least one element of the QCL) in the present disclosure may be replaced with spatial QCL (sQCL).

A plurality of types of QCL (QCL types) may be defined. For example, four QCL types A to D with different parameters (or parameter sets) that can be assumed to be identical may be provided. These parameters (which may be referred to as QCL parameters) are as follows:

QCL type A (QCL-A): Doppler shift, Doppler spread, average delay, and delay spread;

QCL type B (QCL-B): Doppler shift and Doppler spread;

QCL type C (QCL-C): Doppler shift and average delay; and

QCL type D (QCL-D): spatial Rx parameter.

It may be referred to as a QCL assumption for the UE to assume that a given control resource set (CORESET), channel, or reference signal has a specific QCL (for example, QCL type D) relation with another CORESET, channel, or reference signal.

The UE may determine at least one of a transmission beam (Tx beam) and a reception beam (Rx beam) of a signal/channel on the basis of the TCI state of the signal/channel or the QCL assumption.

The TCI state may be, for example, information regarding the QCL of a target channel (in other words, a reference signal (RS) for the channel) and another signal (for example, another RS). The TCI state may be configured (indicated) by higher layer signaling, physical layer signaling, or a combination thereof.

In the present disclosure, the higher layer signaling may be any of, for example, radio resource control (RRC) signaling, medium access control (MAC) signaling, broadcast information, and the like, or a combination thereof.

For example, a MAC control element (MAC CE), a MAC protocol data unit (PDU), or the like may be used for the MAC signaling. The broadcast information may be, for example, a master information block (MIB), a system information block (SIB), remaining minimum system information (RMSI), other system information (OSI), or the like.

The physical layer signaling may be, for example, downlink control information (DCI).

Note that, a channel/signal to which the TCI state is applied may be referred to as a target channel/reference signal (RS), simply a target, or the like, and the other signal may be referred to as a reference signal (reference RS), a source RS, simply a reference, or the like.

A channel for which a TCI state or spatial relation is configured (specified) may be, for example, at least one of a physical downlink shared channel (PDSCH), a physical downlink control channel (PDCCH), a physical uplink shared channel (PUSCH), and a physical uplink control channel (PUCCH).

In addition, an RS having a QCL relation with the channel may be, for example, at least one of a synchronization signal block (SSB), a channel state information reference signal (CSI-RS)), a sounding reference signal (SRS), a tracking CSI-RS (also referred to as a tracking reference signal (TRS)), a QCL detection reference signal (also referred to as a QRS), a demodulation reference signal (DMRS), or the like.

The SSB is a signal block including at least one of a primary synchronization signal (PSS), a secondary synchronization signal (SSS), and a broadcast channel (physical broadcast channel (PBCH)). The SSB may be referred to as an SS/PBCH block.

An RS of QCL type X in a TCI state may mean an RS in a QCL type X relation with (DMRS of) a given channel/signal, and this RS may be referred to as a QCL source of QCL type X in the TCI state.

(Inter-Cell Mobility)

In NR, studies are underway to allow one or more transmission/reception points (TRPs) (multi-TRPs (MTRPs)) to perform DL transmission to the UE. In addition, it is considered that the UE performs UL transmission to one or a plurality of TRPs.

Figure 1B:
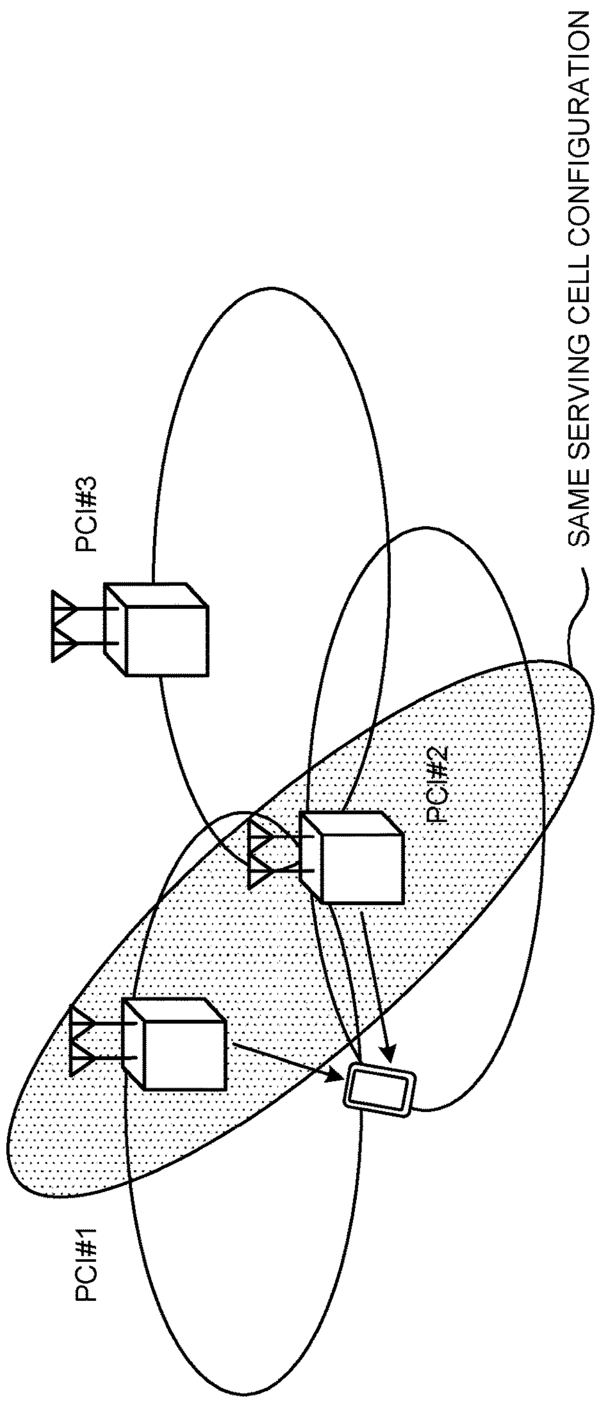

It is conceivable that the UE receives channels/signals from a plurality of cells/TRPs in inter-cell mobility (for example, L1/L2 inter cell mobility) (see FIGS. 1A and 1B).

FIG. 1A illustrates an example of inter-cell mobility (for example, single-TRP inter-cell mobility) including a non-serving cell. Here, a case where the UE receives the channel/signal from the base station/TRP of cell #1 that is the serving cell and the base station/TRP of cell #3 that is not the serving cell (non-serving cell) is illustrated. For example, this corresponds to a case where the UE switches from cell #1 to cell #3 (for example, fast cell switch).

In this case, the TCI state may be updated by the DCI/MAC CE, and the selection of a port (for example, an antenna port)/TRP may be dynamically performed. Different physical cell IDs (for example, PCIs) are configured for cell #1 and cell #3.

FIG. 1B illustrates an example of a multi-TRP scenario (for example, inter-cell mobility in the case where multi-TRPs are used (multi-TRP inter-cell mobility)). Here, a case where the UE receives the channel/signal from TRP #1 and TRP 2. Here, a case where TRP #1 exists in cell #1 (PCI #1) and TRP #2 exists in cell #2 (PCI #2) is illustrated.

The multi-TRPs (TRP #1 and TRP #2) may be connected by an ideal/non-ideal backhaul, and information, data, and the like may be exchanged. A different codeword (CW) and a different layer may be transmitted from each TRP of the multi-TRPs. Non-coherent joint transmission (NCJT) may be used as one form of multi-TRP transmission as illustrated in FIG. 1B. Here, a case where NCJT is performed between a plurality of cells (for example, cells with different PCIs) is illustrated. Note that the same serving cell configuration may be applied/configured for TRP #1 and TRP #2.

In the NCJT, for example, TRP #1 performs modulation mapping and layer mapping on a first codeword, uses first precoding in a first number of layers (for example, two layers), and transmits a first signal/channel (for example, PDSCH). In addition, TRP #2 performs modulation mapping and layer mapping on a second codeword, uses second precoding in a second number of layers (for example, two layers), and transmits a second signal/channel (for example, PDSCH).

A plurality of PDSCHs (multi-PDSCHs) subjected to the NCJT may be defined as partially or completely overlapping regarding at least one of time domain or frequency domain. That is, the first PDSCH from TRP #1 and the second PDSCH from TRP #2 may overlap in at least one of time resource or frequency resource.

The first PDSCH and the second PDSCH may be assumed not to be in quasi-co-location (QCL) relation (not quasi-co-located). Reception of the multi-PDSCHs may be replaced with simultaneous reception of PDSCHs that are not of a given QCL type (for example, QCL type D).

A plurality of PDSCHs (which may be referred to as multiple PDSCHs) from the multi-TRPs may be scheduled by using one piece of DCI (single DCI (S-DCI), single PDCCH) (single master mode). One piece of DCI may be transmitted from one TRP of the multi-TRPs. A configuration utilizing one piece of DCI in the multi-TRPs may be referred to as single DCI-based multi-TRPs (mTRP/MTRP).

Each of a plurality of PDSCHs from the multi-TRPs may be scheduled by using a plurality of pieces of DCI (multi-DCI (M-DCI), multiple PDCCHs (multi-master mode). The plurality of pieces of DCI may be respectively transmitted from the multi-TRPs. A configuration using the plurality of pieces of DCI in the multi-TRPs may be referred to as multi-DCI-based multi-TRPs (mTRP/MTRP).

It may be assumed that the UE transmits, to different TRPs, different CSI reports (CSI reports) regarding the respective TRPs. Such CSI feedback may be referred to as separate feedback, separate CSI feedback, or the like. In the present disclosure, "separate" may be replaced with "independent".

As illustrated in FIG. 1, in a case where a plurality of TRPs is used, distances between the UE and the respective TRPs may be different from each other. For example, when a given TRP corresponds to a serving cell and another TRP corresponds to a non-serving cell, the distances between the TRPs and the UE are different.

In the existing system, a transmission timing of an uplink (UL) channel and/or a UL signal (UL channel/signal) is adjusted by timing advance (TA). The timing of reception of UL channels/signals from different user terminals (UE) is adjusted on a radio base station (TRP: Transmission and Reception Point, gNB: gNodeB, and the like) side.

In at least one of the inter-cell mobility including a non-serving cell and the multi-TRP scenario, how to control the adjustment (for example, configuration/adjustment of the timing advance) of the timing of the UL transmission becomes a problem.

For example, how to support the timing advance (for example, TA) that differs between the serving cell and the non-serving cell becomes a problem.

In addition, it is also conceivable to perform PRACH transmission using the PDCCH order for timing advance measurement for the serving cell/non-serving cell. In such a case, how to control the PRACH transmission (or measurement of timing advance using PRACH) becomes a problem.

For example, when the PRACH is triggered by the PDCCH order, how the UE controls transmission conditions (for example, PRACH configuration/transmission power) applied to the PRACH transmission triggered by the PDCCH order (or trigger of the PRACH) becomes a problem.

The present inventors have studied UL transmission timing control for a plurality of cells (for example, serving cell/non-serving cell), and conceived the present embodiment.

Hereinafter, embodiments according to the present disclosure will be described in detail with reference to the drawings. The respective aspects may be applied independently or may be applied in combination.

Note that, in the present disclosure, "A/B" may mean "at least one of A and B", and "A/B/C" may mean "at least one of A, B, and C".

In the present disclosure, activate, deactivate, indicate, select, configure, update, determine, and the like may be replaced with each other.

In the present disclosure, the RRC, the RRC parameter, the RRC message, the higher layer parameter, the information element (IE), and the configuration may be replaced with each other. In the present disclosure, the MAC CE, the update command, and the activation/deactivation command may be replaced with each other. In the present disclosure, support, control, controllable, operate, and operable may be replaced with each other.

In addition, in the present disclosure, the sequence, the list, the set, the group, the cohort, and the like may be replaced with each other.

In the present disclosure, the panel, the beam, the panel group, the beam group, the uplink (UL) transmission entity, the TRP, the spatial relation information (SRI), the spatial relation, the control resource set (CORESET), the physical downlink shared channel (PDSCH), the codeword, the base station, the given antenna port (for example, demodulation reference signal (DMRS) port), the given antenna port group (for example, DMRS port group), the given group (for example, code division multiplexing (CDM) group, given reference signal group, and CORESET group), the given resource (for example, given reference signal resource), the given resource set (for example, given reference signal resource set), the CORESET pool, the PUCCH group (PUCCH resource group), the spatial relation group, the downlink TCI state (DL TCI state), the uplink TCI state (UL TCI state), the unified TCI state, and the like may be replaced with each other.

The panel may relate to at least one of a group index of the SSB/CSI-RS group, a group index of the group-based beam reporting, and a group index of the SSB/CSI-RS group for the group-based beam reporting.

In addition, the panel identifier (ID) and the panel may be replaced with each other. That is, the TRP ID and the TRP, the CORESET group ID and the CORESET group, and the like may be replaced with each other.

In the present disclosure, the index, the ID, the indicator, and the resource ID may be replaced with each other. In the present disclosure, the sequence, the list, the set, the group, the cohort, the cluster, the subset, and the like may be replaced with each other.

In the present disclosure, the UE in which the plurality of TRPs is configured may determine at least one of the TRP corresponding to the DCI, the TRP corresponding to the PDSCH or the UL transmission (PUCCH, PUSCH, SRS, or the like) scheduled by the DCI, and the like, on the basis of at least one of the following.

- A value of a given field (for example, a field for specifying the TRP, an antenna port field, and PRI) included in the DCI.
- DMRS (for example, a sequence of the DMRS, a resource, a CDM group, a DMRS port, a DMRS port group, an antenna port group, or the like) corresponding to the scheduled PDSCH/PUSCH.
- DMRS (for example, a sequence of the DMRS, a resource, a CDM group, a DMRS port, a DMRS port group, or the like) corresponding to the PDCCH on which the DCI is sent.
- CORESET (for example, a CORESET pool ID of the CORESET, an ID of the CORESET, a scramble ID (which may be replaced with a sequence ID), a resource, and the like) receiving DCI
- RS (such as RS-related group) used for the TCI state, the QCL assumption, the spatial relation information, and the like.

In the present disclosure, a single PDCCH (DCI) may be referred to as a PDCCH (DCI) of a first scheduling type (for example, scheduling type A (or type 1)). In addition, multi-PDCCHs (DCI) may be referred to as a PDCCH (DCI) of a second scheduling type (for example, scheduling type B (or type 2)).

In the present disclosure, regarding the single DCI, an i-th TRP (TRP #i) may mean an i-th TCI state, an i-th CDM group, and the like (i is an integer). Regarding multi-DCI, an i-th TRP (TRP #i) may mean a CORESET corresponding to a CORESET pool index=i, an i-th TCI state, an i-th CDM group, and the like (i is an integer).

In the present disclosure, the single PDCCH may be assumed to be supported when multi-TRPs use ideal backhaul. The multi-PDCCHs may be assumed to be supported when the multi-TRPs use non-ideal backhaul.

Note that the ideal backhaul may be referred to as a DMRS port group type 1, a reference signal related group type 1, an antenna port group type 1, a CORESET pool type 1, and the like. Note that the non-ideal backhaul may be referred to as a DMRS port group type 2, a reference signal related group type 2, an antenna port group type 2, a CORESET pool type 2, and the like. The name is not limited thereto.

In the present disclosure, the multi-TRPs, the multi-TRP system, the multi-TRP transmission, and the multi-PDSCHs may be replaced with each other.

In the present disclosure, the single DCI (sDCI), the single PDCCH, the single-DCI-based multi-TRP system, the sDCI-based MTRP, and that activating the two TCI states on at least one TCI codepoint may be replaced with one another.

In the present disclosure, the multi-DCI (mDCI), the multi-PDCCHs, the multi-DCI-based multi-TRP system, the mDCI-based MTRP, and that configuring two CORESET pool indexes or CORESET pool index=1 (or a value of 1 or more) may be replaced with each other.

The QCL of the present disclosure may be replaced with the QCL type D.

In the following description, maintenance, adjustment, update, configuration, measurement, calculation, and acquisition of TA may be replaced with each other.

The configuration described in the following aspects may be used for PRACH transmission in timing advance measurement when transmission to a plurality of cells (for example, a serving cell and a non-serving cell) is supported, or may be used for PRACH transmission for usages other than timing advance measurement.

(First Aspect)

A first aspect describes an example of UE operation (for example, PRACH configuration applied to PRACH transmission) when an indication of PRACH transmission is received.

In the present disclosure, the indication of the PRACH transmission may be performed by the PDCCH (or DCI), and the PDCCH indicating the PRACH transmission may be referred to as a PDCCH order (for example, PDCCH order). In addition, the PRACH to be transmitted on the basis of the PDCCH order may be referred to as a PRACH subjected to the PDCCH order (for example, PDCCH order PRACH).

The UE transmits the PRACH to at least one of the serving cell and the non-serving cell on the basis of the PDCCH order. The cell to which the PRACH is transmitted may be explicitly indicated/configured by information (for example, RRC/MAC CE/DCI) notified from the base station to the UE, or may be implicitly indicated/configured. The information notification of which is provided from the base station may be at least one of given higher layer signaling and the PDCCH order.

Alternatively, the cell to which the PRACH is transmitted may not be notified from the base station to the UE, and the UE may control the PRACH transmission using a given PRACH configuration on the basis of the PDCCH order.

When receiving the PDCCH indicating the PRACH transmission, the UE may control the transmission of the PRACH on the basis of at least one of Options 1-1 to 1-2 below. For example, the UE may determine at least one of a parameter used for the PRACH transmission, a PRACH configuration (for example, PRACH configuration), and a PRACH resource configuration (for example, PRACH resource configuration) on the basis of at least one of Options 1-1 to 1-2 below. In the present disclosure, the PRACH configuration, the PRACH transmission parameter, and the PRACH resource configuration may be replaced with each other.

<Option 1-1>

The UE may control the transmission of the PRACH using the PRACH configuration corresponding to a specific cell regardless of the cell (for example, the destination cell) to which the PRACH is transmitted. For example, when receiving the PDCCH order, the UE may control the transmission of the PRACH using the PRACH configuration corresponding to a specific cell (for example, the serving cell) (see FIG. 2A).

Figure 2A:
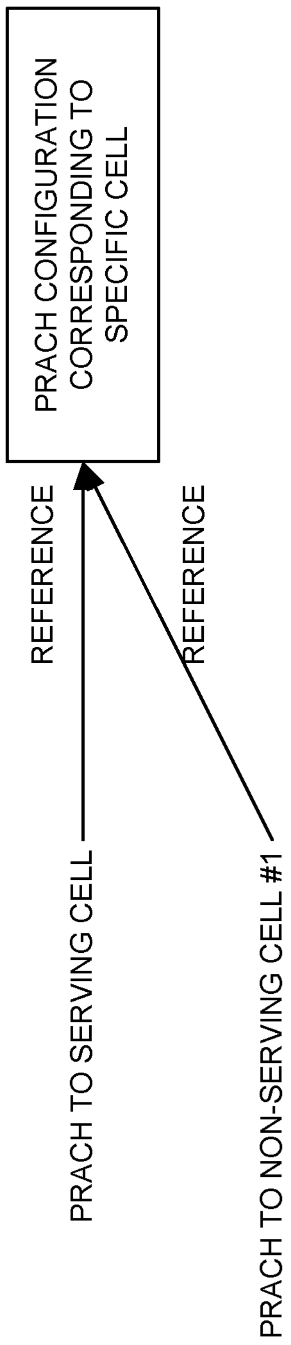
FIGS. 2A and 2B are diagrams illustrating an example of PRACH transmission control according to a first aspect.

FIG. 2A illustrates a case where the same/common PRACH configuration is used for the PRACH transmission for the serving cell and the PRACH transmission for the non-serving cell.

The PRACH configuration corresponding to the serving cell and the PRACH configuration corresponding to the non-serving cell may be the same/common. For example, the PRACH configuration corresponding to a specific cell (for example, the serving cell) may be configured from the base station to the UE, and the UE may control the PRACH transmission using the PRACH configuration configured for the specific cell regardless of the cell to which the PRACH is transmitted. Note that the PRACH configuration may be configured without being associated with the cell, or may be configured for the PRACH transmission with respect to the PDCCH order.

Note that the UE may transmit the PRACH without determining (or without regard to) whether the PRACH transmission target cell is the serving cell or the non-serving cell. In this case, it is possible to make it unnecessary for the base station to notify the UE of the information of the cell to which the PRACH is transmitted.

The PRACH transmitted from the UE may be configured to be received by one of the serving cell and the non-serving cell, or may be configured to be received by both the serving cell and the non-serving cell. The operation of receiving the PRACH may be base station impl.

The configuration of the PDCCH order is the same as that of the existing system (for example, before Rel. 16), and the enhancement of the PDCCH order may not be performed.

Alternatively, the base station may indicate/configure the information of the cell to which the PRACH is transmitted, to the UE. In this case, it is sufficient if the base station corresponding to the cell to which the PRACH is transmitted receives the PRACH.

The cell (or the base station) that transmits the PDCCH order may be a specific cell (for example, the serving cell), or may be configured to be not limited to the specific cell (for example, the cell (or the base station) transmitting the PDCCH order is not defined in the specifications).

As described above, when the PRACH transmission to the serving cell/non-serving cell is supported, it is possible to suppress an increase in the overhead of the information configured/indicated from the base station to the UE by using the common PRACH configuration for the PRACH transmission.

<Option 1-2>

The UE may control the transmission of the PRACH (or PRACH configuration to be applied) on the basis of a cell (for example, destination cell) to which the PRACH is transmitted. For example, when receiving the PDCCH order, the UE may control the transmission of the PRACH using the PRACH configuration corresponding to the cell to which the PRACH is transmitted (see FIG. 2B).

Figure 2B:
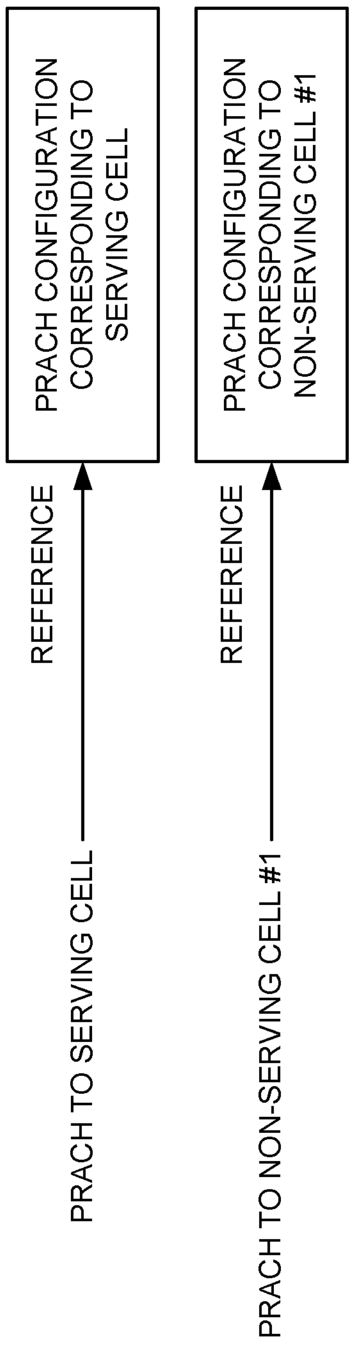

In FIG. 2B, a first PRACH configuration (for example, PRACH configuration corresponding to the serving cell) is used for the PRACH (for example, PDCCH order PRACH) transmission to a first cell (for example, the serving cell). On the other hand, a case where a second PRACH configuration (for example, PRACH configuration corresponding to the non-serving cell) is used for the PRACH (for example, PDCCH order PRACH) transmission to a second cell (for example, the non-serving cell) is illustrated.

The first PRACH configuration corresponding to the first cell (for example, the serving cell) and the second PRACH configuration corresponding to the second PRACH configuration (for example, the non-serving cell) may be separately configured by higher layer signaling or the like.

The PRACH configuration of the existing system (for example, before Rel. 16) may be used for the serving cell, and the PRACH configuration for the non-serving cell may be supported by a new RRC parameter (for example, Rel. 17 RRC parameter) in addition to the PRACH configuration.

When there is a plurality of first cells, a common PRACH configuration may be applied/configured to the plurality of first cells. Alternatively, when there is a plurality of first cells, the PRACH configuration may be separately applied/configured to the plurality of first cells.

When there is a plurality of second cells, a common PRACH configuration may be applied/configured to the plurality of second cells. Alternatively, when there is a plurality of second cells, the PRACH configuration may be separately applied/configured to the plurality of second cells. Note that the PRACH configuration may be commonly configured for the plurality of first cells, and the PRACH configuration may be separately configured for the plurality of second cells. Alternatively, the PRACH configuration may be separately configured for the plurality of first cells, and the PRACH configuration may be commonly configured for the plurality of second cells.

The UE may transmit the PRACH to either the serving cell or the non-serving on the basis of the PDCCH order.

The information regarding the target cell to which the PRACH configuration applied to the PRACH transmission corresponds or the target cell of the PRACH transmission may be explicitly or implicitly indicated from the base station to the UE.

For example, the target cell may be indicated by the PDCCH order (or DCI). In this case, the configuration of the PDCCH order may be enhanced.

Alternatively, the target cell may be implicitly indicated to the UE on the basis of a parameter corresponding to the PRACH transmission or other signal/channel (for example, synchronization signal block (SSB)/PDCCH order) related to the PRACH transmission.

For example, the UE may determine the target cell on the basis of at least one of Options 1-2-1 to 1-2-3 below.

<<Option 1-2-1>>

The UE may determine the cell corresponding to the PDCCH order (or PRACH that performs transmission by the PDCCH order) on the basis of a given parameter used for the PDCCH of the PDCCH order (or other signal/channel related to the PDCCH).

For example, a quasi-co-location source (for example, QCL source) of the PDCCH utilized for the PDCCH order may be utilized to implicitly indicate to the UE whether the target cell is a serving cell or a non-serving cell. In this case, the target cell can be indicated to the UE without enhancing the PDCCH order.

When the PDCCH order (for example, PDCCH/DCI) becomes QCL with the serving cell, the UE may perform control to transmit the PRACH (for example, PDCCH ordered PRACH) indicated to be transmitted by the PDCCH order to the serving cell. In this case, it is sufficient if the UE applies the PRACH configuration associated with the serving cell to the PRACH transmission.

When the PDCCH order (for example, PDCCH/DCI/CORESET) becomes QCL with the non-serving cell, the UE may perform control to transmit the PRACH (for example, PDCCH ordered PRACH) indicated to be transmitted by the PDCCH order to the non-serving cell. In this case, it is sufficient if the UE applies the PRACH configuration associated with the non-serving cell to the PRACH transmission.

Figure 3:
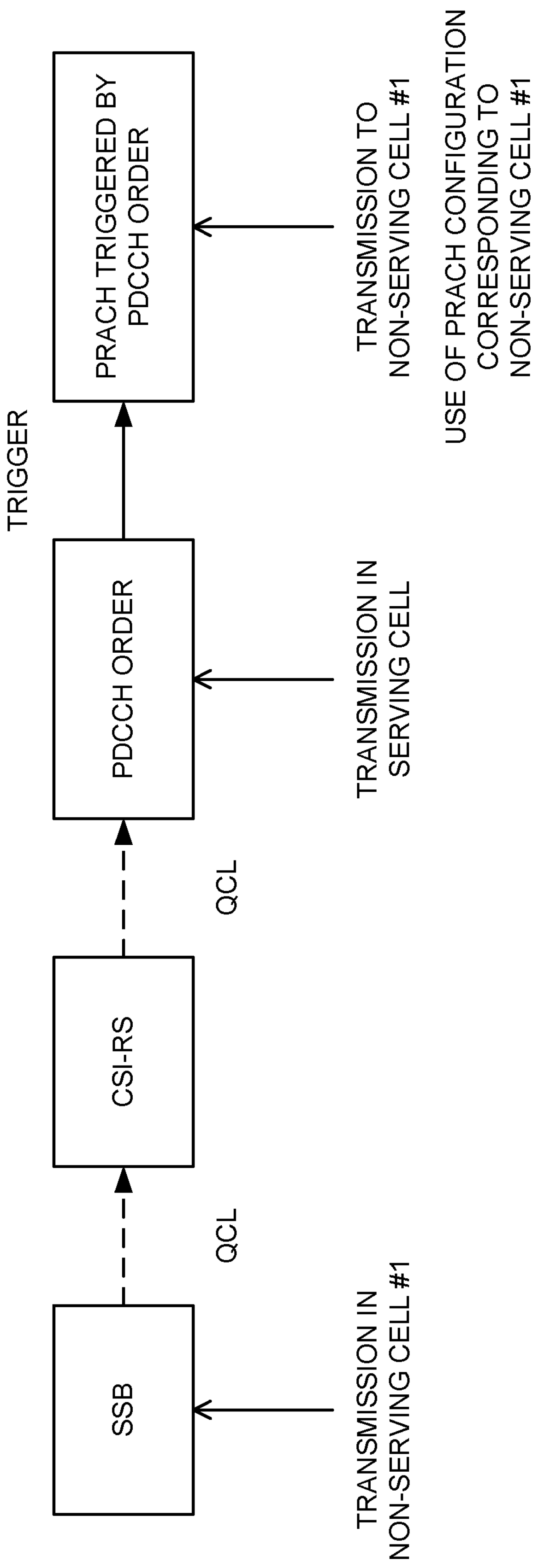
FIG. 3 is a diagram illustrating another example of the PRACH transmission control according to the first aspect.

FIG. 3 illustrates a case where the synchronization signal block/CSI-RS transmitted in the non-serving cell (here, cell #1) and the PDCCH order (PDCCH/DCI/CORESET) transmitted in the serving cell are QCL. In this case, the UE may determine that the PRACH transmission to non-serving cell #1 is triggered by the PDCCH order.

Non-serving cell #1 may be configured/specified as a non-serving cell (PCI #1), or may be configured/indicated as different/additional/another PCI #1.

In this way, by implicitly notifying the UE of the target cell, it is not necessary to explicitly indicate the target cell by the PDCCH order. As a result, an increase in the overhead of the PDCCH order can be suppressed.

Alternatively, the given parameter may be, for example, the TCI state.

For example, when the base station transmits the PDCCH order for PRACH and the PDCCH (or DCI/CORESET) is associated with the TCI state from the non-serving cell, the PRACH requested by the PDCCH order may correspond to the non-serving cell. In this case, the UE may control the PRACH transmission on the basis of the PRACH configuration of the non-serving cell. Thereafter, the UE may determine the TA of the non-serving cell on the basis of the DL transmission (for example, RAR) fed back to the PRACH transmission.

When the PDCCH (or DCI/CORESET) is associated with the TCI state from the serving cell, the PRACH requested by the PDCCH order may correspond to the serving cell. In this case, the UE may control the transmission of the PRACH on the basis of the PRACH configuration of the serving cell. Thereafter, the UE may determine the TA of the serving cell on the basis of the DL transmission (for example, RAR) fed back to the PRACH transmission.

<<Option 1-2-2>>

The UE may determine the cell corresponding to the PDCCH order (or PRACH transmitted by the PDCCH order) on the basis of the DCI (or CORESET) used for the PDCCH order.

For example, the UE may be notified of the DCI used by the PDCCH order including identification information (for example, cell index/cell type (for example, serving cell/non-serving cell)) of the cell corresponding to the PRACH. In a given DCI format (for example, DCI format 1_0) used for the PDCCH order, X reserved bits of the DCI may be used for cell notification to explicitly indicate the serving cell/non-serving cell to which the PRACH corresponds. The reserved bit may be a reserved bit included in DCI format 1_0 in the existing system (for example, Rel. 15/16).

The bit size of X may be configured/judged/determined on the basis of the configured number of non-serving cells. For example, when one non-serving cell is configured, X may be one bit. The most significant bit (MSB) or the least significant bit (LSB) of the reserved bit may be applied to the field used for notification of the identification information of the cell.

In addition, when three non-serving cells are configured, X may be two bits. An index of the re-indexed non-serving cell may be applied to indicate the non-serving cell. The association between the cell index and the bit value (or codepoint) may be defined in the specifications or may be configured by higher layer signaling or the like. For example, codepoint '0' or '00' may indicate a serving cell, and the remaining bits may be associated with the index order (for example, in ascending/descending order) of the configured non-serving cell.

Alternatively, the size of X may be fixed, and the number of bits may not be changed regardless of the number of non-serving cells to be configured. In this case, unused bits/fields may be configured as a reserved bit.

<<Option 1-2-3>>

In a case where a preamble index (for example, ra-PreambleIndex) of random access is a given value (for example, 0 to 63), a part of the preamble may be configured/activated by the RRC/MAC CE to be related to the non-serving cell.

In this case, the information of the serving cell/non-serving cell may be indicated by a given field of a given DCI format (for example, DCI format 1_0). The given field may be, for example, a random access preamble index field (for example, Random Access Preamble index field). Note that the preamble configuration related to the non-serving cell may be configured to be applied only to the PRACH transmission based on the PDCCH order (or configured not to be applied to a collision-type PRACH transmission).

When the preamble related to the non-serving cell is indicated by the DCI, the UE may control, according to the RACH configuration of the non-serving cell, to perform the PRACH transmission with the indicated preamble.

The UE may adjust the TA of indicated one or more cells after the PRACH based on the PDCCH order. The information regarding TA may be received by a response signal (for example, RAR) to the PRACH transmission.

(Second Aspect)

A second aspect describes another example of UE operation (for example, received power applied to PRACH transmission) when an indication of PRACH transmission is received.

In the existing system (for example, before Rel. 16), when the PRACH is triggered by the PDCCH order, transmission power (for example, referenceSignalPower) of the PRACH is determined on the basis of a parameter (for example, higher layer parameter ss-PBCH-BlockPower) related to a synchronization signal block.

In a case where the configuration in which the PRACH is transmitted to at least one of the serving cell and the non-serving cell on the basis of the PDCCH order is supported, how to control the transmission power of the PRACH triggered by the PDCCH order becomes a problem.

In the second aspect, the transmission power of the PRACH transmission is controlled on the basis of a given parameter (for example, the parameter related to the synchronization signal block/ss-PBCH-BlockPower) corresponding to a specific cell or a given parameter corresponding to a cell to which the PRACH is transmitted.

The parameter related to the synchronization signal block/ss-PBCH-BlockPower may be average power (energy per resource element (EPRE)) of resource elements that transmit the secondary synchronization signal used by the network (for example, base station) for SSB transmission. The parameter related to the synchronization signal block/ss-PBCH-BlockPower may be notified/configured to the UE by higher layer signaling.

When receiving the PDCCH indicating the PRACH transmission, the UE may control the transmission of the PRACH on the basis of at least one of Options 2-1 to 2-2 below.

<Option 2-1>

The UE may control the transmission power of the PRACH by using a given parameter (for example, the parameter related to the synchronization signal block/ss-PBCH-BlockPower) corresponding to a specific cell regardless of a cell (for example, destination cell) to which the PRACH is transmitted. The given parameter, the given power parameter, and the given power information may be replaced with each other.

Figure 4A:
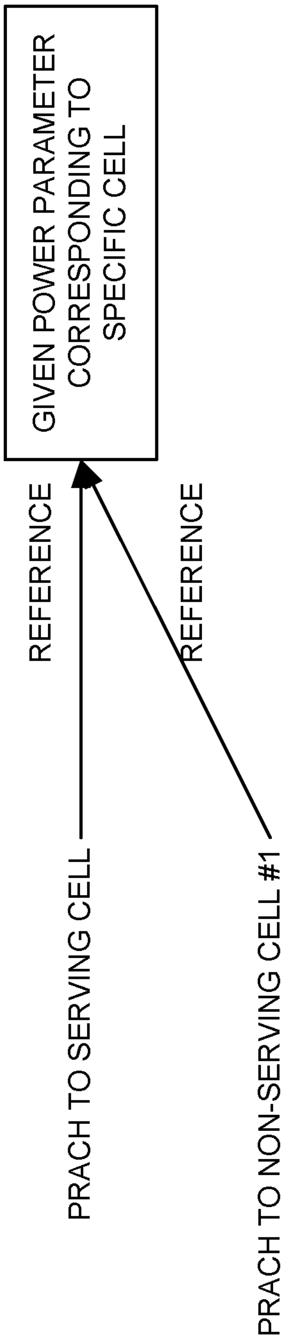
FIGS. 4A and 4B are diagrams illustrating an example of PRACH transmission control according to a second aspect.

For example, when receiving the PDCCH order, the UE may control the transmission power of the PRACH using the given power parameter corresponding to a specific cell (for example, the serving cell) (see FIG. 4A). FIG. 4A illustrates a case where the same/common given power parameter is used for the PRACH transmission for the serving cell and the PRACH transmission for the non-serving cell.

The given power parameter corresponding to the serving cell and the given power parameter corresponding to the non-serving cell may be the same/common. For example, the given power parameter corresponding to a specific cell (for example, the serving cell) may be configured from the base station to the UE, and the UE may control the transmission power of the PRACH using the given power parameter configured for the specific cell regardless of the cell to which the PRACH is transmitted. Note that the given power parameter may be configured without being associated with the cell, or may be configured for the PRACH transmission with respect to the PDCCH order.

Note that the UE may control the transmission power of the PRACH without determining (or without regard to) whether the PRACH transmission target cell is the serving cell or the non-serving cell. In this case, it is possible to make it unnecessary for the base station to notify the UE of the information of the cell to which the PRACH is transmitted.

The configuration of the PDCCH order is the same as that of the existing system (for example, before Rel. 16), and the enhancement of the PDCCH order may not be performed.

As described above, when the PRACH transmission to the serving cell/non-serving cell is supported, it is possible to suppress an increase in the overhead of the information configured/indicated from the base station to the UE by using the common given power parameter for the PRACH transmission.

<Option 2-2>

The UE may control the transmission of the PRACH (or transmission power to be applied) on the basis of a cell (for example, destination cell) to which the PRACH is transmitted. For example, when receiving the PDCCH order, the UE may control the transmission power of the PRACH by using a given power parameter (for example, the parameter related to the synchronization signal block/ss-PBCH-BlockPower) corresponding to a cell to which the PRACH is transmitted (see FIG. 4B).

Figure 4B:
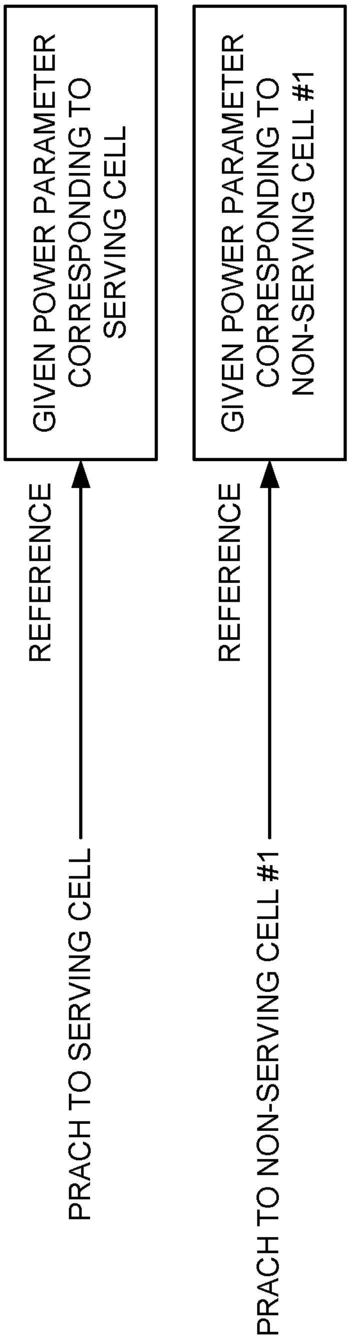

In FIG. 4B, a first given power parameter (for example, given power parameter corresponding to the serving cell) is used for the PRACH (for example, PDCCH order PRACH) transmission to a first cell (for example, the serving cell). On the other hand, a case where a second given power parameter (for example, given power parameter corresponding to the non-serving cell) is used for the PRACH (for example, PDCCH order PRACH) transmission to a second cell (for example, the non-serving cell) is illustrated.

The first given power parameter corresponding to the first cell (for example, the serving cell) and the second given power parameter corresponding to the second PRACH configuration (for example, the non-serving cell) may be separately configured by higher layer signaling or the like.

The given power parameter of the existing system (for example, before Rel. 16) may be used for the serving cell, and the given power parameter (for example, ss-PBCH-BlockPower config) for the non-serving cell may be supported by a new RRC parameter (for example, Rel. 17 RRC parameter) in addition to the given power parameter.

When there is a plurality of first cells, a common given power parameter may be applied/configured to the plurality of first cells. Alternatively, when there is a plurality of first cells, the given power parameter may be separately applied/configured to the plurality of first cells.

When there is a plurality of second cells, a common given power parameter may be applied/configured to the plurality of second cells. Alternatively, when there is a plurality of second cells, the given power parameter may be separately applied/configured to the plurality of second cells. Note that the given power parameter may be commonly configured for the plurality of first cells, and the given power parameter may be separately configured for the plurality of second cells. Alternatively, the given power parameter may be separately configured for the plurality of first cells, and the given power parameter may be commonly configured for the plurality of second cells.

The UE may transmit the PRACH to either the serving cell or the non-serving on the basis of the PDCCH order.

The information regarding the target cell to which the PRACH configuration applied to the PRACH transmission corresponds or the target cell of the PRACH transmission may be explicitly or implicitly indicated from the base station to the UE.

For example, the target cell may be indicated by the PDCCH order (or DCI). In this case, the configuration of the PDCCH order may be enhanced.

Alternatively, the target cell may be implicitly indicated to the UE on the basis of a parameter corresponding to the PRACH transmission or other signal/channel (for example, synchronization signal block (SSB)/PDCCH order) related to the PRACH transmission.

For example, the UE may determine the target cell on the basis of at least one of Options 2-2-1 to 2-2-3 below.

<<Option 2-2-1>>

The UE may determine the cell corresponding to the PDCCH order (or PRACH that performs transmission by the PDCCH order) on the basis of a given parameter used for the PDCCH of the PDCCH order (or other signal/channel related to the PDCCH).

For example, a quasi-co-location source (for example, QCL source) of the PDCCH utilized for the PDCCH order may be utilized to implicitly indicate to the UE whether the target cell is a serving cell or a non-serving cell. In this case, the target cell can be indicated to the UE without enhancing the PDCCH order.

When the PDCCH order (for example, PDCCH/DCI) becomes QCL with the serving cell, the UE may perform control to transmit the PRACH (for example, PDCCH ordered PRACH) indicated to be transmitted by the PDCCH order to the serving cell. In this case, it is sufficient if the UE applies the given power parameter associated with the serving cell to the PRACH transmission.

When the PDCCH order (for example, PDCCH/DCI/CORESET) becomes QCL with the non-serving cell, the UE may perform control to transmit the PRACH (for example, PDCCH ordered PRACH) indicated to be transmitted by the PDCCH order to the non-serving cell. In this case, it is sufficient if the UE applies the given power parameter associated with the non-serving cell to the PRACH transmission.

Figure 5:
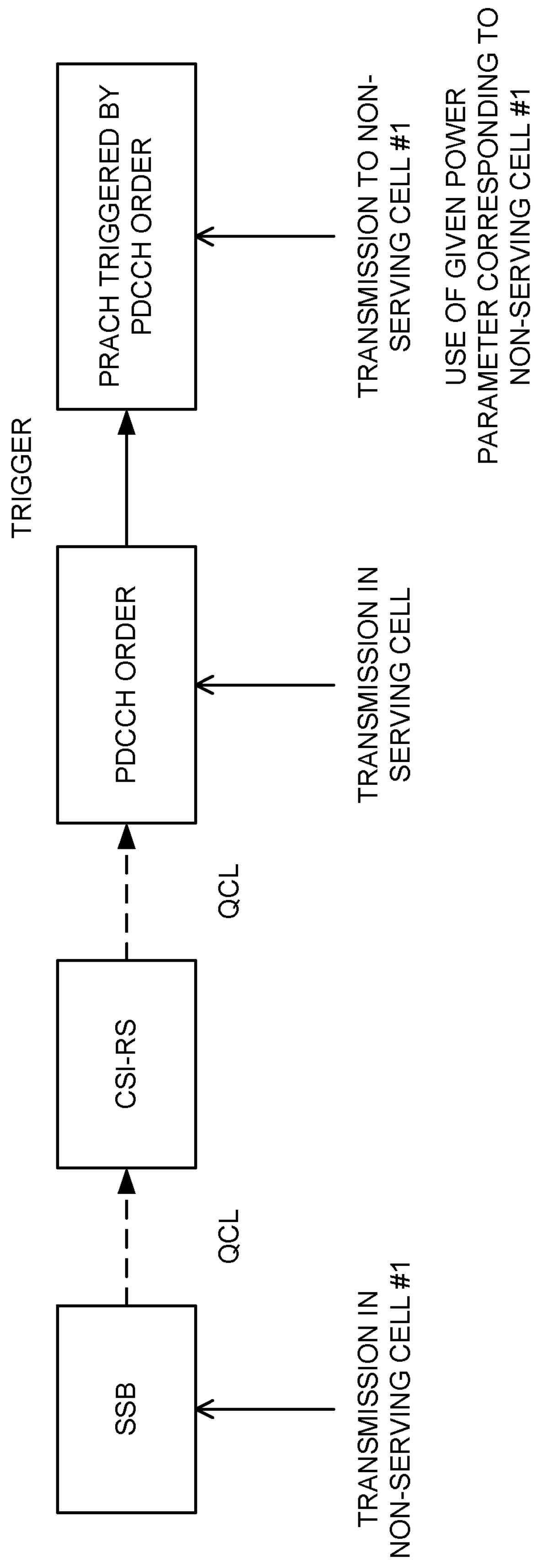
FIG. 5 is a diagram illustrating another example of the PRACH transmission control according to the second aspect.

FIG. 5 illustrates a case where the synchronization signal block/CSI-RS transmitted in the non-serving cell (here, cell #1) and the PDCCH order (PDCCH/DCI/CORESET) transmitted in the serving cell are QCL. In this case, the UE may determine that the PRACH transmission to non-serving cell #1 is triggered by the PDCCH order, and determine the transmission power of the PRACH on the basis of the given power parameter corresponding to non-serving cell #1.

Non-serving cell #1 may be configured/specified as a non-serving cell (PCI #1), or may be configured/indicated as different/additional/another PCI #1.

In this way, by implicitly notifying the UE of the target cell, it is not necessary to explicitly indicate the target cell by the PDCCH order. As a result, an increase in the overhead of the PDCCH order can be suppressed.

Alternatively, the given parameter may be, for example, the TCI state.

For example, when the base station transmits the PDCCH order for PRACH and the PDCCH (or DCI/CORESET) is associated with the TCI state from the non-serving cell, the PRACH requested by the PDCCH order may correspond to the non-serving cell. In this case, the UE may control the PRACH transmission on the basis of the given power parameter of the non-serving cell. Thereafter, the UE may determine the TA of the non-serving cell on the basis of the DL transmission (for example, RAR) fed back to the PRACH transmission.

When the PDCCH (or DCI/CORESET) is associated with the TCI state from the serving cell, the PRACH requested by the PDCCH order may correspond to the serving cell. In this case, the UE may control the transmission of the PRACH on the basis of the given power parameter of the serving cell. Thereafter, the UE may determine the TA of the serving cell on the basis of the DL transmission (for example, RAR) fed back to the PRACH transmission.

<<Option 2-2-2>>

The UE may determine the cell corresponding to the PDCCH order (or PRACH transmitted by the PDCCH order) on the basis of the DCI (or CORESET) used for the PDCCH order. The specific operation may be similar to that of Option 1-2-2 described above.

<<Option 2-2-3>>

In a case where a preamble index (for example, ra-PreambleIndex) of random access is a given value (for example, 0 to 63), a part of the preamble may be configured/activated by the RRC/MAC CE to be related to the non-serving cell. The specific operation may be similar to that of Option 1-2-3 described above.

(Third Aspect)

A third aspect describes quasi-co-location assumption (for example, QCL assumption) for a PRACH (for example, PRACH of Message 1) triggered by the PDCCH order.

In a case where the PRACH transmission is performed by the PDCCH order, a response signal (PDSCH including RAR) and DCI (for example, DCI format 1_0) for scheduling the response signal are transmitted with respect to the PRACH transmission.

In the existing system (for example, Rel. 16), it is defined that the PDCCH (for example, the PDCCH including DCI format 1_0) for scheduling the PDSCH including the RAR and the PDCCH order are quasi-co-located (for example, have the same DMRS antenna port quasi-co-location characteristic). In addition, it is defined that the PDSCH (for example, PDSCH including RAR) scheduled by the PDCCH and the PDCCH order are quasi-co-located.

On the other hand, the existing system does not define how to assume the QCL assumption of the PRACH of Message 1 corresponding to the PRACH triggered by the PDCCH order.

In the third aspect, at least one of Options 3-1 to 3-2 below is applied as a QCL assumption in a case where a configuration in which the PRACH transmission triggered by the PRACH order is performed for at least one of the serving cell and the non-serving cell is supported.

<Option 3-1>

The QCL assumption/spatial relation (for example, QCL assumption/spatial relation) with at least one of given signal/channel may be specified/configured for the PRACH of the PDCCH order for the serving cell/non-serving cell.

The given signal/channel may be at least one of the PRACH of Message 1, the DCI for scheduling the RAR (or PDSCH including RAR), the PDSCH including the RAR, the PUSCH of Message 3, and Message 4.

It is sufficient if the PRACH of Message 1 is a PRACH other than the PRACH triggered by the PDCCH order. For example, it may be a PRACH transmitted in a collision-type PRACH.

The DCI for scheduling the RAR (or PDSCH including RAR) may be, for example, a given DCI format (for example, DCI format 1_0) that is CRC-scrambled with RA-RNTI and schedules the PDSCH including the RAR.

The PDSCH including the RAR may be a PDSCH scheduled by the DCI that is CRC-scrambled with the RA-RNTI.

Message 4 may be a PDCCH (or DCI) corresponding to Message 4 or a PDSCH corresponding to Message 4.

<Option 3-2>

A QCL relation/spatial relation between the PRACH of the PDCCH order and the given signal/channel may be determined/derived on the basis of the synchronization signal block associated with the PDCCH order corresponding to the serving cell or the non-serving cell.

For example, when the SSB related to the PDCCH order corresponds (for example, is transmitted) to the serving cell, it may be determined that the PRACH triggered by the PDCCH order and the given signal/channel corresponding to the serving cell are QCL. In addition, when the SSB related to the PDCCH order corresponds (for example, is transmitted) to the non-serving cell, it may be determined that the PRACH triggered by the PDCCH order and the given signal/channel corresponding to the non-serving cell are QCL.

The kind/type of cell to which the SSB is related may be explicitly indicated by the PDCCH order (Option 3-2-1) or implicitly indicated by the PDCCH order (Option 3-2-2).

<<Option 3-2-1>>

The PDCCH order may explicitly indicate the SSB related to the serving cell or the SSB related to the non-serving cell. For example, which one of the serving cell and the non-serving cell corresponds to may be specified by a given field of the DCI used for the PDCCH order.

<<Option 3-2-2>>

The PDCCH order may implicitly indicate the SSB related to the serving cell or the SSB related to the non-serving cell. For example, which one of the serving cell and the non-serving cell corresponds to may be specified on the basis of a QCL source reference signal (for example, QCL source RS) or a root SSB associated with the serving cell or the non-serving cell.

(UE Capability Information)

In the first to third aspects, the UE capabilities below may be configured. Note that the UE capabilities below may be replaced with a parameter (for example, higher layer parameter) configured from the network (for example, base station) to the UE.

The UE capability information as to whether to support at least one of inter-cell mobility (for example, inter cell mobility) and inter-cell multi-TRP (for example, inter cell multi-TRP) may be defined.

The UE capability information as to whether to support multiple cell IDs/different cell IDs (for example, multiple PCIs/different PCIs) may be defined.

The UE capability information as to whether to support the PRACH (for example, PRACH triggered by the PDCCH order) for a non-serving cell (or different cell ID) may be defined.

The first to third aspects may be configured to be applied to the UE that supports/reports at least one of the UE capabilities described above. Alternatively, the first to third aspects may be configured to be applied to the UE configured from the network.

(Radio Communication System)

Hereinafter, a configuration of a radio communication system according to one embodiment of the present disclosure will be described. In this radio communication system, communication is performed using any one of the radio communication methods according to the embodiments of the present disclosure or a combination thereof.

Figure 6:
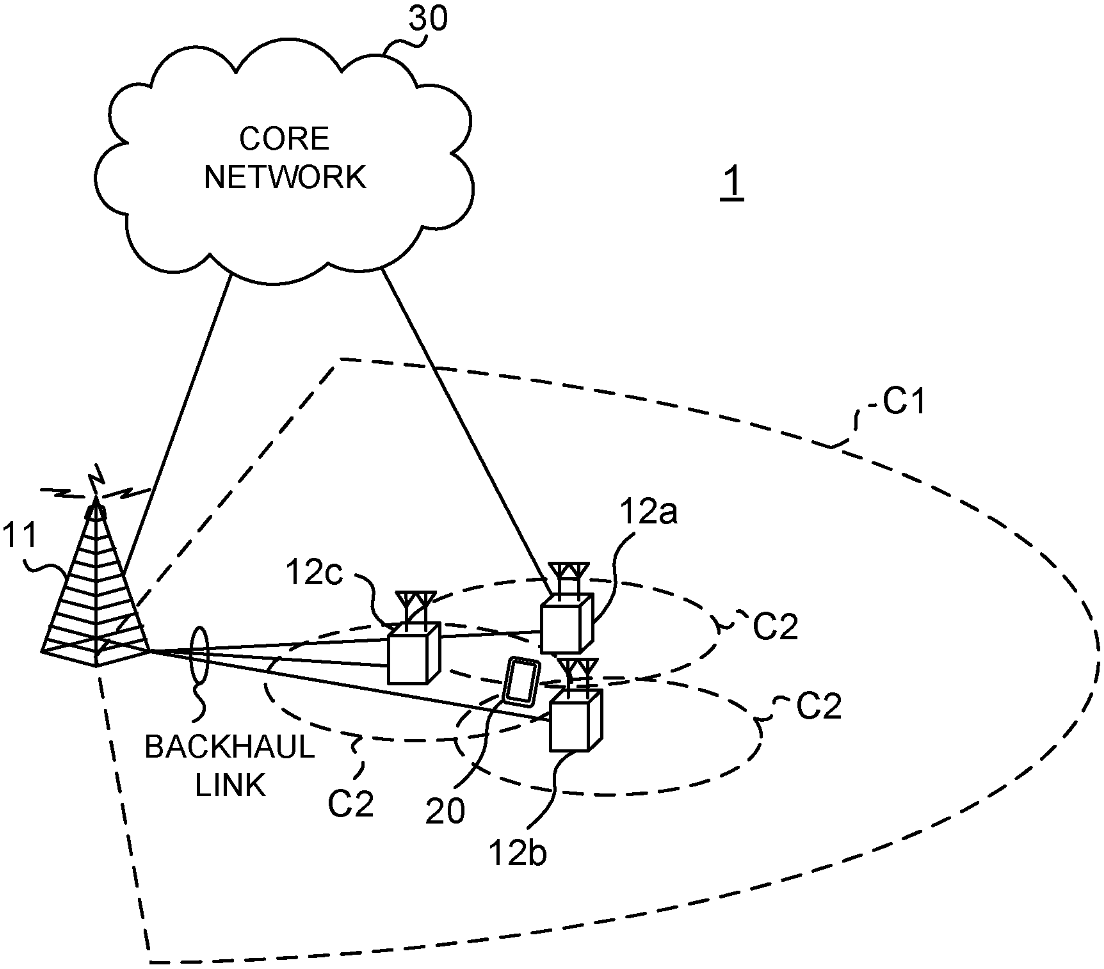
FIG. 6 is a diagram illustrating an example of a schematic configuration of a radio communication system according to one embodiment.

FIG. 6 is a diagram illustrating an example of a schematic configuration of a radio communication system according to one embodiment. A radio communication system 1 may be a system that implements communication using long term evolution (LTE), 5th generation mobile communication system New Radio (5G NR), and the like drafted as the specification by third generation partnership project (3GPP).

In addition, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is the MN, and an LTE (E-UTRA) base station (eNB) is the SN.

The radio communication system 1 may support dual connectivity between a plurality of base stations in the same RAT (for example, dual connectivity in which both the MN and the SN are NR base stations (gNB) (NR-NR dual connectivity (NN-DC)).

The radio communication system 1 may include a base station 11 that forms a macro cell C1 with a relatively wide coverage, and base stations 12 (12*a* to 12*c*) that are disposed within the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as "base stations 10" when the base stations 11 and 12 are not distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a frequency range 1 (FR1) or a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency bands, definitions, and the like of the FR1 and FR2 are not limited thereto, and, for example, the FR1 may correspond to a frequency band higher than the FR2.

In addition, the user terminal 20 may perform communication in each CC using at least one of time division duplex (TDD) or frequency division duplex (FDD).

The plurality of base stations 10 may be connected by wire (e.g., an optical fiber or an X2 interface in compliance with common public radio interface (CPRI)) or wirelessly (e.g., NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of an evolved packet core (EPC), a 5G core network (5GCN), or a next generation core (NGC).

The user terminal 20 may a terminal that corresponds to at least one of communication methods such as LTE, LTE-A, and 5G.

In the radio communication system 1, a radio access method based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH), a physical broadcast channel (PBCH), a physical downlink control channel (PDCCH), or the like shared by the user terminals 20 may be used.

In addition, in the radio communication system 1, as an uplink channel, a physical uplink shared channel (PUSCH), a physical uplink control channel (PUCCH), a physical random access channel (PRACH), or the like shared by the user terminals 20 may be used.

User data, higher layer control information, a system information block (SIB), and the like are transmitted on the PDSCH. The PUSCH may transmit the user data, higher layer control information, and the like. In addition, a master information block (MIB) may be transmitted on the PBCH.

Lower layer control information may be transmitted on the PDCCH. The lower layer control information may include, for example, downlink control information (DCI) including scheduling information of at least one of the PDSCH or the PUSCH.

Note that the DCI that schedules the PDSCH may be referred to as DL assignment, DL DCI, or the like, and the DCI that schedules PUSCH may be referred to as UL grant, UL DCI, or the like. Note that the PDSCH may be replaced with DL data, and the PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor the CORESET associated with a given search space based on search space configuration.

One search space may correspond to a PDCCH candidate corresponding to one or more aggregation levels. One or more search spaces may be referred to as a search space set. Note that "search space" and "search space set", "search space configuration" and "search space set configuration", and "CORESET" and "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), or scheduling request (SR) may be transmitted on the PUCCH. A random access preamble for establishing connection with a cell may be transmitted on the PRACH.

Note that in the present disclosure, downlink, uplink, and the like may be expressed without "link". In addition, various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) or a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

In addition, in the radio communication system 1, a measurement reference signal (sounding reference signal (SRS)), a demodulation reference signal (DMRS), or the like may be transmitted as an uplink reference signal (UL-RS).

Note that, DMRSs may be referred to as "user terminal-specific reference signals (UE-specific Reference Signals)."

(Base Station)

Figure 7:
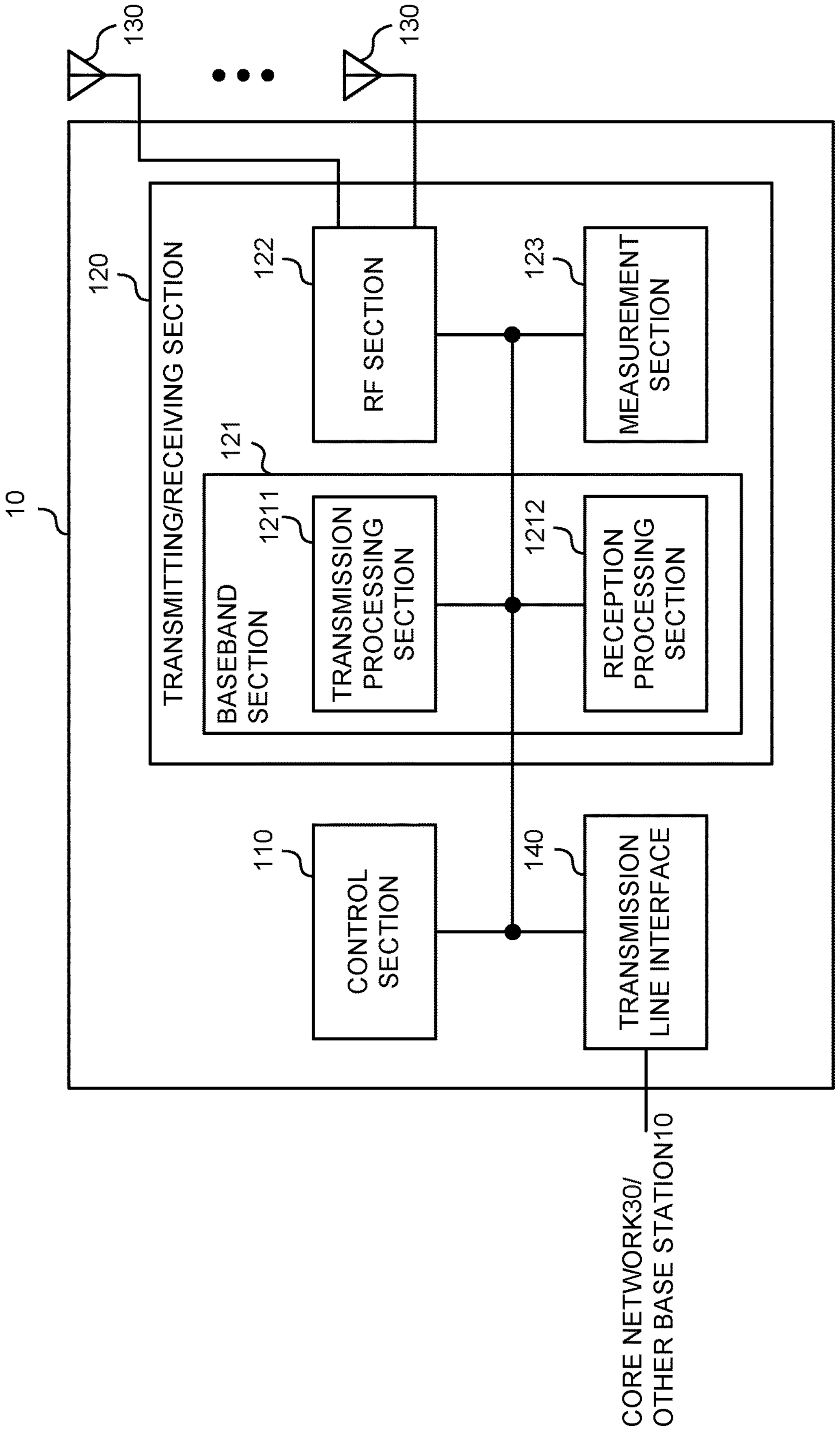
FIG. 7 is a diagram illustrating an example of a configuration of a base station according to one embodiment.

FIG. 7 is a diagram illustrating an example of a configuration of a base station according to one embodiment. The base station 10 includes a control section 110, a transmitting/receiving section 120, a transmitting/receiving antenna 130, and a transmission line interface 140. Note that one or more control sections 110, one or more transmitting/receiving sections 120, one or more transmitting/receiving antennas 130, and one or more transmission line interfaces 140 may be included.

Note that this example mainly describes a functional block which is a characteristic part of the present embodiment, and it may be assumed that the base station 10 also has another functional block necessary for radio communication. A part of processing of each section described below may be omitted.

The control section 110 controls the entire base station 10. The control section 110 can be implemented by a controller, a control circuit, and the like that are described based on common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmitting/receiving antenna 130, and the transmission line interface 140. The control section 110 may generate data to be transmitted as a signal, control information, a sequence, and the like, and may forward the data, the control information, the sequence, and the like to the transmitting/receiving section 120. The control section 110 may perform call processing (such as configuration or releasing) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described on the basis of common recognition in the technical field related to the present disclosure.

The transmitting/receiving section 120 may be configured as an integrated transmitting/receiving section, or may be configured by a transmitting section and a receiving section. The transmitting section may include the transmission processing section 1211 and the RF section 122. The receiving section may include the reception processing section 1212, the RF section 122, and the measurement section 123.

The transmitting/receiving antennas 130 can be implemented by antennas described based on common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam or a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency band, filtering processing, amplification, and the like on the baseband signal, and may transmit a signal in the radio frequency band via the transmitting/receiving antenna 130.

Meanwhile, the transmitting/receiving section 120 (RF section 122) may perform amplification, filtering processing, demodulation to a baseband signal, and the like on the signal in the radio frequency band received by the transmitting/receiving antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM), channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, another base stations 10, and the like, and may acquire, transmit, and the like user data (user plane data), control plane data, and the like for the user terminal 20.

Note that the transmitting section and the receiving section of the base station 10 in the present disclosure may include at least one of the transmitting/receiving section 120, the transmitting/receiving antenna 130, or the transmission line interface 140.

The transmitting/receiving section 120 may transmit a downlink control channel indicating transmission of a random access channel to at least one of a serving cell and a non-serving cell.

When the random access channel is transmitted on the basis of the downlink control channel, the control section 110 may control reception of the random access channel to which at least one of a random access channel configuration corresponding to a given cell and power information regarding a synchronization signal block corresponding to the given cell is applied.

The control section 110 may control reception of a random access channel to which at least one of a random access channel configuration corresponding to a cell to which a random access channel is transmitted and power information regarding a synchronization signal block corresponding to a cell to which a random access channel is transmitted is applied.

(User Terminal)

Figure 8:
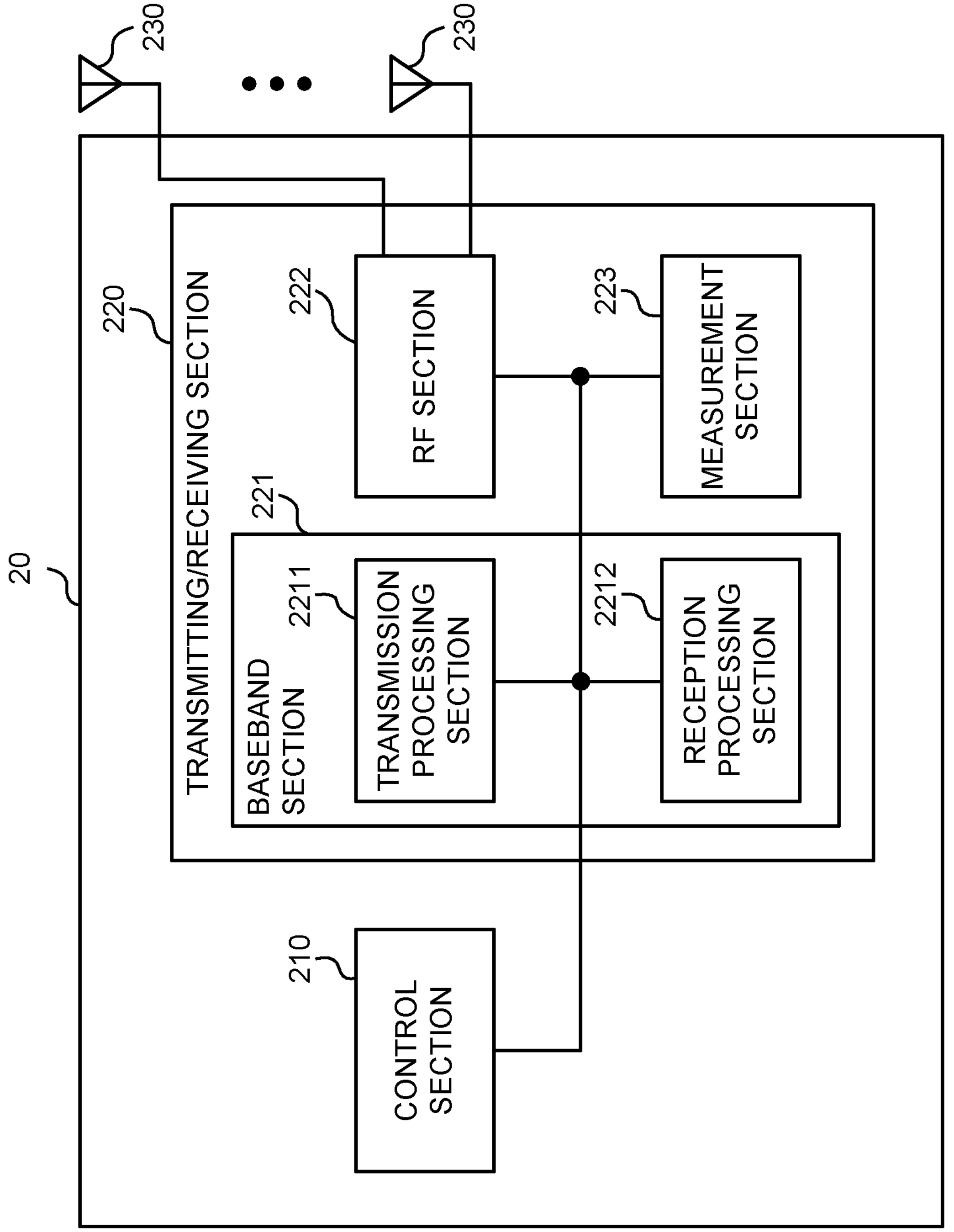
FIG. 8 is a diagram illustrating an example of a configuration of a user terminal according to one embodiment.

FIG. 8 is a diagram illustrating an example of a configuration of the user terminal according to one embodiment. The user terminal 20 includes a control section 210, a transmitting/receiving section 220, and a transmitting/receiving antenna 230. Note that one or more of the control sections 210, one or more of the transmitting/receiving sections 220, and one or more of the transmitting/receiving antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can include a controller, a control circuit, and the like that are described on the basis of common recognition in the technical field related to the present disclosure.

The control section 210 may control signal generation, mapping, and the like. The control section 210 may control transmission/reception, measurement, and the like using the transmitting/receiving section 220 and the transmitting/receiving antenna 230. The control section 210 may generate data, control information, a sequence, and the like to be transmitted as signals, and may forward the data, control information, sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be implemented by a transmitter/receiver, an RF circuit, a baseband circuit, a filter, a phase shifter, a measurement circuit, a transmission/reception circuit, and the like that are described based on common recognition in the technical field related to the present disclosure.

The transmitting/receiving section 220 may be formed as an integrated transmitting/receiving section, or may include a transmitting section and a receiving section. The transmitting section may include the transmission processing section 2211 and the RF section 222. The receiving section may include the reception processing section 2212, the RF section 222, and the measurement section 223.

The transmitting/receiving antenna 230 can include an antenna described on the basis of common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam or a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, and the like acquired from the control section 210, to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined based on configuration of transform precoding. In a case where transform precoding is enabled for a given channel (e.g., PUSCH), the transmitting/receiving section 220 (transmission processing section 2211) may perform DFT processing as the transmission processing in order to transmit the channel using a DFT-s-OFDM waveform. In a case where it is not the case, DFT processing need not be performed as the transmission processing.

The transmitting/receiving section 220 (RF section 222) may perform modulation to a radio frequency range, filtering processing, amplification, and the like on the baseband signal, to transmit a signal in the radio frequency range via the transmitting/receiving antenna 230.

Meanwhile, the transmitting/receiving section 220 (RF section 222) may perform amplification, filtering processing, demodulation to a baseband signal, and the like on the signal in the radio frequency range received by the transmitting/receiving antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that, the transmitting section and the receiving section of the user terminal 20 in the present disclosure may include at least one of the transmitting/receiving section 220 and the transmitting/receiving antenna 230.

The transmitting/receiving section 220 may receive a downlink control channel indicating transmission of a random access channel to at least one of a serving cell and a non-serving cell.

When the random access channel is transmitted on the basis of the downlink control channel, the control section 210 may control transmission of the random access channel on the basis of at least one of a random access channel configuration corresponding to a given cell and power information regarding a synchronization signal block corresponding to the given cell.

The control section 210 may control transmission of a random access channel on the basis of at least one of a random access channel configuration corresponding to a cell to which a random access channel is transmitted and power information regarding a synchronization signal block corresponding to a cell to which a random access channel is transmitted.

The control section 210 may determine at least one of a cell to which a random access channel is transmitted, a random access channel configuration applied to the transmission of the random access channel, and transmission power applied to the transmission of the random access channel on the basis of a cell with which a downlink control channel is quasi-co-located.

The control section 210 may determine at least one of a signal and a channel with which a random access channel is quasi-co-located on the basis of a synchronization signal block associated by a downlink control channel.

(Hardware Configuration)

Note that the block diagrams that have been used to describe the above embodiments illustrate blocks in functional units. These functional blocks (components) may be implemented in arbitrary combinations of at least one of hardware or software. In addition, the method for implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional block may be realized by combining the one apparatus or the plurality of apparatuses with software.

Here, the function includes, but is not limited to, determining, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like. For example, a functional block (component) that has a transmission function may be referred to as a transmitting section (transmitting unit), a transmitter, and the like. In any case, as described above, the implementation method is not particularly limited.

Figure 9:
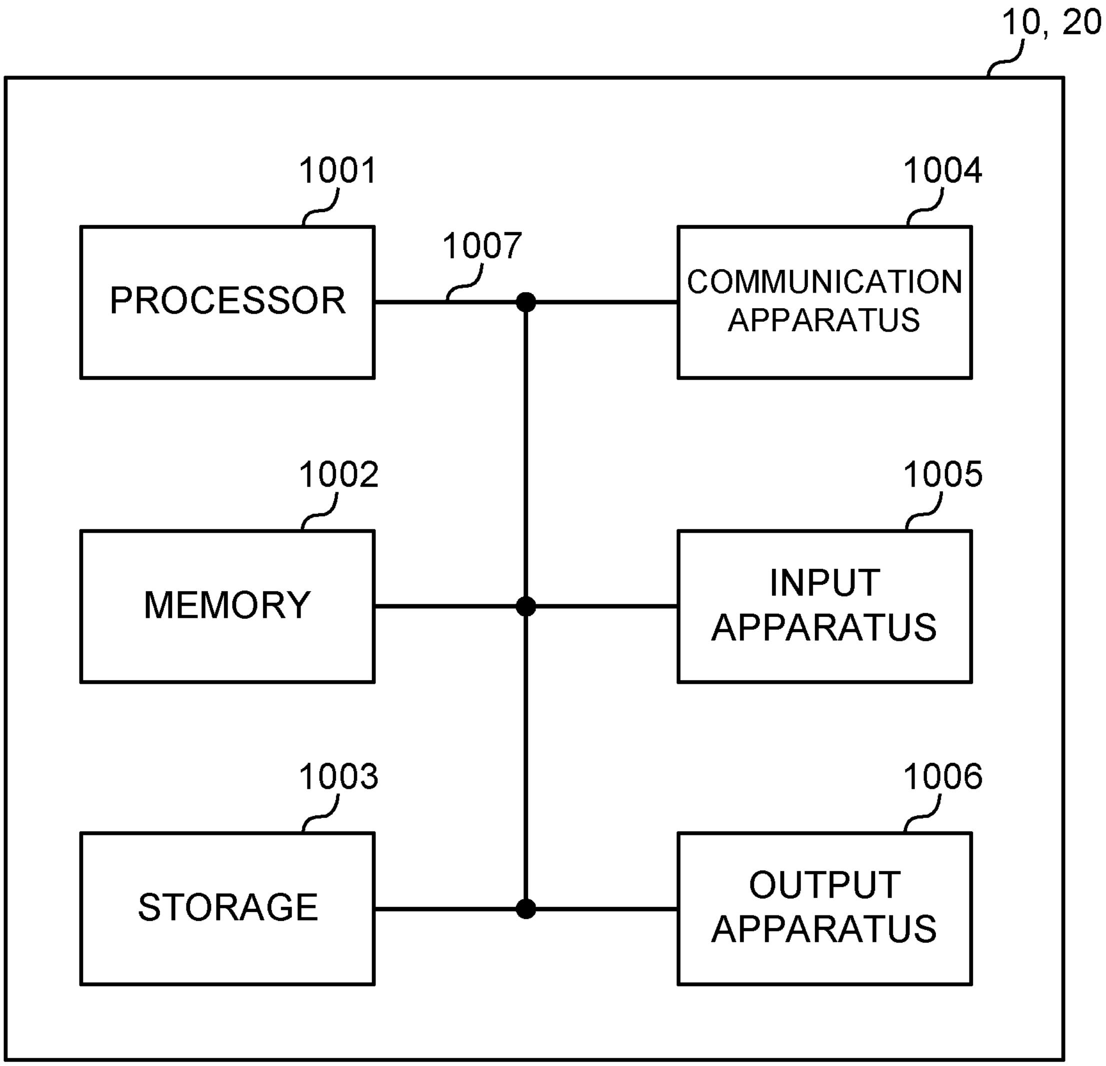
FIG. 9 is a diagram illustrating an example of a hardware configuration of the base station and the user terminal according to one embodiment.

For example, the base station, the user terminal, and the like according to one embodiment of the present disclosure may function as a computer that executes the processing of the radio communication method of the present disclosure. FIG. 9 is a diagram illustrating an example of a hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit can be replaced with each other. The hardware configuration of the base station 10 and the user terminal 20 may be designed to include one or more of the apparatuses illustrated in the drawings, or may be designed not to include some apparatuses.

For example, although only one processor 1001 is shown, a plurality of processors may be provided. In addition, the processing may be executed by one processor, or the processing may be executed by two or more processors simultaneously or sequentially, or using other methods. Note that the processor 1001 may be implemented with one or more chips.

Each function of the base station 10 and the user terminal 20 is implemented by given software (program) being read on hardware such as the processor 1001 and the memory 1002, by which the processor 1001 performs operations, controlling communication via the communication apparatus 1004, and controlling at least one of reading or writing of data at the memory 1002 and the storage 1003.

The processor 1001 may control the whole computer by, for example, running an operating system. The processor 1001 may be implemented by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

In addition, the processor 1001 reads programs (program codes), software modules, data, etc. from at least one of the storage 1003 or the communication apparatus 1004 into the memory 1002, and performs various types of processing according to these. As the program, a program that causes a computer to execute at least a part of the operation described in the above-described embodiment is used. For example, the control section 110 (210) may be implemented by control programs that are stored in the memory 1002 and that operate on the processor 1001, and other functional blocks may be implemented likewise.

The memory 1002 is a computer-readable recording medium, and may include, for example, at least one of a read only memory (ROM), an erasable programmable ROM (EPROM), an electrically EPROM (EEPROM), a random access memory (RAM), or other appropriate storage media. The memory 1002 may be referred to as a register, a cache, a main memory (primary storage apparatus), and the like. The memory 1002 can store programs (program codes), software modules, etc. that are executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disk, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as secondary storage apparatus.

The communication apparatus 1004 is hardware (transmission/reception device) for performing inter-computer communication via at least one of a wired network or a wireless network, and is referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) or time division duplex (TDD). For example, the transmitting/receiving section 120 (220), the transmitting/receiving antenna 130 (230), and the like described above may be implemented by the communication apparatus 1004. The transmitting/receiving section 120 (220) may be implemented by being physically or logically separated into the transmitting section 120*a* (220*a*) and the receiving section 120*b* (220*b*).

The input apparatus 1005 is an input device for receiving input from the outside (for example, a keyboard, a mouse, a microphone, a switch, a button, a sensor and so on). The output apparatus 1006 is an output device that performs output to the outside (for example, a display, a speaker, a light emitting diode (LED) lamp, or the like). Note that the input apparatus 1005 and the output apparatus 1006 may be provided in an integrated structure (for example, a touch panel).

In addition, these pieces of apparatus, including the processor 1001, the memory 1002 and so on are connected by the bus 1007 so as to communicate information. The bus 1007 may be formed with a single bus, or may be formed with buses that vary between pieces of apparatus.

In addition, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by using the hardware. For example, the processor 1001 may be implemented with at least one of these pieces of hardware.

(Modifications)

Note that terms described in the present disclosure and terms necessary for understanding the present disclosure may be replaced with terms that have the same or similar meanings. For example, a channel, a symbol, and a signal (signal or signaling) may be replaced with each other. In addition, the signal may be a message. The reference signal can be abbreviated as an RS, and may be referred to as a pilot, a pilot signal, and the like, depending on which standard applies. In addition, a component carrier (CC) may be referred to as a cell, a frequency carrier, a carrier frequency, and the like.

A radio frame may be comprised of one or more periods (frames) in the time domain. Each of the one or more periods (frames) included in the radio frame may be referred to as a subframe. Further, the subframe may include one or more slots in the time domain. The subframe may be a fixed time duration (for example, 1 ms) that is not dependent on numerology.

Here, the numerology may be a communication parameter used for at least one of transmission or reception of a given signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, or specific windowing processing performed by a transceiver in the time domain.

The slot may include one or more symbols in the time domain (orthogonal frequency division multiplexing (OFDM) symbols, single carrier frequency division multiple access (SC-FDMA) symbols, and the like). In addition, a slot may be a time unit based on numerology.

The slot may include a plurality of mini slots. Each mini slot may include one or more symbols in the time domain. In addition, the mini slot may be referred to as a subslot. Each mini slot may include fewer symbols than the slot. A PDSCH (or PUSCH) transmitted in a time unit larger than the mini slot may be referred to as "PDSCH (PUSCH) mapping type A". A PDSCH (or a PUSCH) transmitted using a mini slot may be referred to as PDSCH (PUSCH) mapping type B.

A radio frame, a subframe, a slot, a minislot and a symbol all represent the time unit in signal communication. The radio frame, the subframe, the slot, the mini slot, and the symbol may be called by other applicable names, respectively. Note that time units such as a frame, a subframe, a slot, a mini slot, and a symbol in the present disclosure may be replaced with each other.

For example, one subframe may be referred to as TTI, a plurality of consecutive subframes may be referred to as TTI, or one slot or one mini slot may be referred to as TTI. That is, at least one of the subframe or the TTI may be a subframe (1 ms) in the existing LTE, may be a period shorter than 1 ms (for example, one to thirteen symbols), or may be a period longer than 1 ms. Note that the unit to represent the TTI may be referred to as a "slot", a "mini slot" and so on, instead of a "subframe."

Here, a TTI refers to the minimum time unit of scheduling in radio communication, for example. For example, in the LTE system, a base station performs scheduling to allocate radio resources (a frequency bandwidth, transmission power, and the like that can be used in each user terminal) to each user terminal in TTI units. Note that the definition of TTIs is not limited to this.

The TTI may be a transmission time unit of a channel-coded data packet (transport block), a code block, a codeword, etc. or may be a processing unit of scheduling, link adaptation, etc. Note that when the TTI is given, a time interval (e.g., the number of symbols) to which a transport block, a code block, a codeword, or the like is actually mapped may be shorter than the TTI.

Note that, when one slot or one minislot is referred to as a "TTI", one or more TTIs (that is, one or multiple slots or one or more minislots) may be the minimum time unit of scheduling. In addition, the number of slots (the number of minislots) to constitute this minimum time unit of scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, or the like. A TTI that is shorter than the usual TTI may be referred to as a shortened TTI, a short TTI, a partial TTI (or fractional TTI), a shortened subframe, a short subframe, a mini slot, a subslot, a slot, or the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or more consecutive subcarriers in the frequency domain. The number of subcarriers included in the RB may be the same regardless of the numerology, and may be twelve, for example. The number of subcarriers included in an RB may be determined based on a numerology.

In addition, an RB may include one or more symbols in the time domain, and may be one slot, one minislot, one subframe or one TTI in length. One TTI, one subframe, etc. may each be comprised of one or more resource blocks.

Note that one or more RBs may be referred to as a physical resource block (PRB), a subcarrier group (SCG), a resource element group (REG), a PRB pair, an RB pair, and the like.

In addition, a resource block may include one or more resource elements (REs). For example, one RE may be a radio resource field of one subcarrier and one symbol.

A bandwidth part (BWP) (which may be referred to as a partial bandwidth or the like) may represent a subset of consecutive common resource blocks (RBs) for a given numerology in a given carrier. Here, the common RB may be specified by the index of the RB based on a common reference point of the carrier. PRBs may be defined in a BWP and numbered within the BWP.

The BWP may include a BWP for UL (UL BWP) and a BWP for DL (DL BWP). For the UE, one or more BWPs may be configured within one carrier.

At least one of the configured BWPs may be active, and the UE may not assume to transmit or receive a given channel/signal outside the active BWP. Note that "cell", "carrier", etc. in the present disclosure may be replaced with "BWP".

Note that the structures of radio frames, subframes, slots, minislots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

In addition, the information, parameters, etc. described in the present disclosure may be represented using absolute values, or may be represented using relative values with respect to given values, or may be represented using other corresponding information. For example, a radio resource may be specified by a given index.

The names used for parameters etc. in the present disclosure are in no respect limiting. Further, any mathematical expression or the like that uses these parameters may differ from those explicitly disclosed in the present disclosure. Since various channels (PUCCH, PDCCH, and the like) and information elements can be identified by any suitable names, various names allocated to these various channels and information elements are not restrictive names in any respect.

The information, signals, etc. described in the present disclosure may be represented using any of a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

In addition, information, signals, etc. can be output in at least one of a direction from a higher layer to a lower layer or a direction from a lower layer to a higher layer. Information, signals and so on may be input and output via a plurality of network nodes.

The information, signals and so on that are input and/or output may be stored in a specific location (for example, in a memory), or may be managed in a control table. The information, signals, and the like to be input and output can be overwritten, updated, or appended. The output information, signals, and the like may be deleted. The information, signals and so on that are input may be transmitted to other pieces of apparatus.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. In addition, the RRC signaling may be referred to as an RRC message, and may be, for example, an RRC connection setup message, an RRC connection reconfiguration message, and the like. In addition, notification of the MAC signaling may be performed using, for example, an MAC control element (CE).

In addition, reporting of given information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

In addition, software, commands, information and so on may be transmitted and received via communication media. For example, when software is transmitted from a website, a server, or another remote source by using at least one of a wired technology (coaxial cable, optical fiber cable, twisted pair, digital subscriber line (DSL), or the like) or a wireless technology (infrared rays, microwaves, and the like), at least one of the wired technology or the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of at least one of the base station or the base station subsystem that performs a communication service in this coverage.

In the present disclosure, the terms such as "mobile station (MS)", "user terminal", "user equipment (UE)", and "terminal" can be used interchangeably.

The mobile station may be referred to as a subscriber station, mobile unit, subscriber station, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station or the mobile station may be called as a transmitting apparatus, a receiving apparatus, a wireless communication apparatus, and the like. Note that at least one of the base station or the mobile station may be a device mounted on a moving object, a moving object itself, and the like. The moving object may be a transportation (for example, a car, an airplane, or the like), an unmanned moving object (for example, a drone, an autonomous car, or the like), or a (manned or unmanned) robot. Note that at least one of the base station or the mobile station also includes an apparatus that does not necessarily move during a communication operation. For example, at least one of the base station or the mobile station may be an Internet of Things (IoT) device such as a sensor.

In addition, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. In addition, terms such as "uplink" and "downlink" may be replaced with terms corresponding to communication between terminals (for example, "side"). For example, an uplink channel, a downlink channel, or the like may be replaced with a side channel.

Similarly, the user terminal in the present disclosure may be replaced with the base station. In this case, the base station 10 may have the functions of the user terminal 20 described above.

In the present disclosure, an operation performed by the base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

The aspects/embodiments illustrated in the present disclosure may be used individually or in combinations, which may be switched depending on the mode of implementation. In addition, the order of processing procedures, sequences, flowcharts, and the like of the aspects/embodiments described in the present disclosure may be re-ordered as long as there is no inconsistency. For example, the methods described in the present disclosure have presented various step elements using an exemplary order, and are not limited to the presented specific order.

Each aspect/embodiment described in the present disclosure may be applied to a system using long term evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (x is, for example, an integer or decimal)), future radio access (FRA), new radio access technology (RAT), new radio (NR), new radio access (NX), future generation radio access (FX), global system for mobile communications (GSM (registered trademark)), CDMA 2000, ultra mobile broadband (U4B), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded on the basis of these, and the like. In addition, a plurality of systems may be combined and applied (for example, a combination of LTE or LTE-A and 5G, and the like).

The phrase "based on" as used in the present disclosure does not mean "based only on", unless otherwise specified. In other words, the phrase "based on" means both "based only on" and "based at least on."

All references to the elements using designations such as "first" and "second" as used in the present disclosure do not generally limit the amount or sequence of these elements. These designations can be used in the present disclosure, as a convenient way of distinguishing between two or more elements. In this way, reference to the first and second elements does not imply that only two elements may be employed, or that the first element must precede the second element in some way.

The term "determining" as used in the present disclosure may include a wide variety of operations. For example, "determining" may be regarded as "determining" judging, calculating, computing, processing, deriving, investigating, looking up (or searching or inquiring) (for example, looking up in a table, database, or another data structure), asgiven-ing, and the like.

In addition, to "judge" and "determine" as used herein may be interpreted to mean making judgements and determinations related to receiving (for example, receiving information), transmitting (for example, transmitting information), inputting, outputting, accessing (for example, accessing data in a memory) and so on.

In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

In addition, "determining" may be replaced with "assuming", "expecting", "considering", or the like.

The terms "connected" and "coupled" used in the present disclosure, or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

In the present disclosure, when two elements are connected together, it is conceivable that the two elements are "connected" or "coupled" to each other by using one or more electrical wires, cables, printed electrical connections, and the like, and, as some non-limiting and non-inclusive examples, by using electromagnetic energy having wavelengths in the radio frequency domain, microwave region, or optical (both visible and invisible) region, or the like.

In the present disclosure, the terms "A and B are different" may mean "A and B are different from each other". Note that the phrase may mean that "A and B are different from C". The terms such as "separate", "coupled", and the like may be interpreted similarly to "different".

When "include", "including", and variations of these are used in the present disclosure, these terms are intended to be inclusive similarly to the term "comprising". Moreover, the term "or" used in the present disclosure is intended to be not an exclusive-OR.

In the present disclosure, when articles are added by translation, for example, as "a", "an", and "the" in English, the present disclosure may include that nouns that follow these articles are plural.

In the above, the invention according to the present disclosure has been described in detail; however, it is obvious to those skilled in the art that the invention according to the present disclosure is not limited to the embodiments described in the present disclosure. The invention according to the present disclosure can be embodied with various corrections and in various modified aspects, without departing from the spirit and scope of the invention defined on the basis of the description of claims. Consequently, the description of the present disclosure is provided only for the purpose of explaining examples, and should by no means be construed to limit the invention according to the present disclosure in any way.

This application is based on Japanese Patent Application No. 2021-132433 filed on Aug. 16, 2021. The contents of this are all incorporated herein.

The invention claimed is:

1. A terminal comprising:

a receiver that receives a physical downlink control channel (PDCCH) indicating a physical random access channel (PRACH) transmission to a different cell than a serving cell; and a processor that, when the PRACH transmission is performed based on the PDCCH, controls the PRACH transmission based on power information related to a synchronization signal block (SSB) corresponding to the different cell than the serving cell, wherein the processor determines a PRACH configuration applied to the PRACH transmission, based on a cell that receives an SSB quasi-co-located (QCLed) with a channel state information reference signal (CSI-RS) QCLed with a demodulation reference signal of the PDCCH.

2. The terminal according to claim 1, wherein the different cell than the serving cell is configured by a physical cell ID that is different from a physical cell ID of the serving cell.

3. A radio communication method for a terminal, comprising:

receiving a physical downlink control channel (PDCCH) indicating a physical random access channel (PRACH) transmission to a different cell than a serving cell;

when the PRACH transmission is performed based on the PDCCH, controlling the PRACH transmission based on power information related to a synchronization signal block (SSB) corresponding to the different cell than the serving cell; and determining a PRACH configuration applied to the PRACH transmission, based on a cell that receives an SSB quasi-co-located (QCLed) with a channel state information reference signal (CSI-RS) QCLed with a demodulation reference signal of the PDCCH.

4. A base station comprising:

a transmitter that transmits a physical downlink control channel (PDCCH) indicating a physical random access channel (PRACH) transmission to a different cell than a serving cell; and a processor that, when the PRACH transmission is performed based on the PDCCH, controls the PRACH transmission based on power information related to a synchronization signal block (SSB) corresponding to the different cell than the serving cell, wherein the processor notifies a PRACH configuration applied to the PRACH transmission, based on a cell that transmits an SSB quasi-co-located (QCLed) with a channel state information reference signal (CSI-RS) QCLed with a demodulation reference signal of the PDCCH.

5. A system comprising a terminal and a base station, wherein the terminal comprises:

a receiver that receives a physical downlink control channel (PDCCH) indicating a physical random access channel (PRACH) transmission to a different cell than a serving cell; and a processor that, when the PRACH transmission is performed based on the PDCCH, controls the PRACH transmission based on power information related to a synchronization signal block (SSB) corresponding to the different cell than the serving cell, wherein the processor determines a PRACH configuration applied to the PRACH transmission, based on a cell that receives an SSB quasi-co-located (QCLed) with a channel state information reference signal (CSI-RS) QCLed with a demodulation reference signal of the PDCCH, and the base station comprises:

a transmitter that transmits the PDCCH.

* * * * *